United States Patent [19]

Tusim

[11] Patent Number: 4,839,396

[45] Date of Patent: Jun. 13, 1989

[54] EXPANDABLE AND EXPANDED ALKENYL AROMATIC POLYMER PARTICLES AND METHODS OF MAKING THE SAME

[75] Inventor: Martin H. Tusim, Newark, Ohio

[73] Assignee: The Dow Chemical Company, Midland, Mich.

[21] Appl. No.: 234,986

[22] Filed: Aug. 22, 1988

[51] Int. Cl.$^4$ .............................................. C08J 9/16
[52] U.S. Cl. ...................................... 521/88; 521/56; 521/60; 521/97
[58] Field of Search ...................... 521/88, 97, 56, 60

[56] References Cited

U.S. PATENT DOCUMENTS

| | | | |
|---|---|---|---|
| 3,505,253 | 4/1970 | Finestone et al. | 521/56 |
| 3,511,796 | 5/1970 | Wright | 521/56 |
| 3,513,223 | 5/1970 | Smart | 521/56 |

*Primary Examiner*—Morton Foelak

[57] ABSTRACT

The present invention relates to expandable and expanded alkenyl aromatic polymer particles having the ability to use a decreased amount of blowing agent to produce an expanded alkenyl aromatic polymer particle of an equivalent bulk density or the same amount of blowing agent to produce an expanded alkenyl aromatic polymer particle having a decreased bulk density by including a density modifier in the expandable alkenyl aromatic polymer particle in an amount of about 0.005 to 0.5 weight percent by weight of the total mixture. Also included as part of the invention are methods of making the expandable and expanded alkenyl aromatic polymer particles wherein the expandable and expanded alkenyl aromatic polymer particles have a density modifier included in an amount of about 0.005 percent to about 0.5 weight percent by weight of the total mixture.

10 Claims, No Drawings

EXPANDABLE AND EXPANDED ALKENYL AROMATIC POLYMER PARTICLES AND METHODS OF MAKING THE SAME

This invention relates to improved expandable and expanded alkenyl aromatic polymer particles and methods for preparing these expandable and expanded particles.

Alkenyl aromatic polymer particles or beads, which are expandable or expanded, are known to be highly desirable for a number of uses. One highly desirable use is protection in packaging articles for shipping. Typical materials are set forth in U.S. Pat. Nos. 3,066,382; 3,188,264; 3,251,728 and 3,933,959. Another use for the expandable alkenyl aromatic polymer particles is as molding material.

Although such expanded alkenyl aromatic polymer particles are highly desirable, they suffer from a substantial and significant problem of the high cost of shipping in the expanded state due to their very low bulk density. It is therefore generally desirable to ship a product having a maximum bulk density, as an expandable alkenyl aromatic polymer particle, and to subsequently expand the particle at or near the point of use into the desired form such as expanded alkenyl aromatic polymer packaging particles or expanded and molded alkenyl aromatic polymer foamed objects.

It is also advantageous when such expandable alkenyl aromatic polymer particles are expanded into plastic foam to achieve as low a bulk density as possible. It is also desirable when expanding the expandable alkenyl aromatic polymer particle to obtain the lowest bulk density in as short a time as possible.

It is even more desirable to decrease the amount of blowing agent used to prepare the expandable and expanded alkenyl aromatic polymer particles, especially if the blowing agent is a blowing agent which is believed to cause damage to the earth's atmospheric layer.

Thus the present invention allows the making of an expanded particle having an equivalent density while using a decreased amount of a blowing agent or a lower density using the same amount of a blowing agent when a density modifier is incorporated into the particle prior to expansion.

SUMMARY OF THE INVENTION

The present invention is expandable particles comprising an alkenyl aromatic polymer, a volatile fluid blowing agent and a density modifier in an amount from about 0.005 percent to about 0.5 percent by weight of the total mixture. The present invention is also expanded particles comprising an alkenyl aromatic polymer and a density modifier in an amount from about 0.005 percent to about 0.5 percent by weight of the total mixture.

Also contemplated are methods for making the expanded and expandable particles by preparing a heat-plastified mixture of an alkenyl aromatic polymer, a volatile fluid blowing agent, and a density modifier in an amount from about 0.005 percent to about 0.5 percent by weight of the total mixture and extruding the mixture to form expandable and expanded alkenyl aromatic polymer particles.

Still further contemplated as part of the present invention are methods for reducing the density in expanded alkenyl aromatic polymer particles while using a constant amount of a volatile fluid blowing agent and for reducing the amount of a volatile fluid blowing agent needed to produce expanded alkenyl aromatic polymer particles while maintaining a constant density. Both methods are accomplished by incorporating a density modifier into the expanded alkenyl aromatic polymer particles prior to expansion, with the alkenyl aromatic polymer being a polymer or copolymer having in chemically combined form at least 50 percent by weight styrene.

DETAILED DESCRIPTION OF ILLUSTRATIVE EMBODIMENTS

The expandable particles of the present invention are thermoplastic resinous materials containing a density modifier and a blowing agent. The expanded particles of the present invention are the thermoplastic resinous materials containing a density modifier.

The present invention is expandable and expanded alkenyl aromatic polymer particles with the term alkenyl aromatic polymer including polymers or copolymers having in chemically combined form at least 50 percent by weight of at least one alkenyl aromatic compound having the general formula

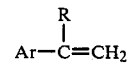

wherein the Ar represents an aromatic hydrocarbon radical or an aromatic halohydrocarbon radical of the benzene series and R is hydrogen or the methyl radical. Examples of such alkenyl aromatic resins are the solid homopolymers of styrene, α-methylstyrene, o-methylstyrene, m-methylstyrene, p-methylstyrene, ar-ethylstyrene, ar-vinylxylene, ar-chlorostyrene, or ar-bromostyrene; the solid copolymers of two or more of such alkenyl aromatic compounds with minor amounts of other readily polymerizable olefinic compounds such as divinylbenzene, methylmethacrylate or acrylonitrile, etc.

Preferably, the alkenyl aromatic polymer is polystyrene having an weight-average molecular weight ($M_w$) of 100,000 to 300,000.

The volatile fluid foaming agents can be gases such as carbon dioxide, a saturated aliphatic hydrocarbon such as butane, isobutane, pentane, isopentane, neopentane, hexane, heptane or mixtures of one or more aliphatic hydrocarbons having a molecular weight of at least 65 and a boiling point not higher than 95° centigrade (C.) at 760 millimeters absolute pressure. Other suitable fluid foaming agents are those halogenated hydrocarbons generally known in the art. The volatile fluid foaming usually is employed in amounts corresponding to from about 5 to about 15 percent of the weight of the total formulation. After expansion the volatile fluid blowing agent may or may not be retained in the expanded alkenyl aromatic polymer particle.

It is well known in the art to extrude foamable alkenyl aromatic polymer particles by cooling the viscous melt of the alkenyl aromatic polymer and the blowing agent below the blowing temperature under pressure and subsequently passing a strand into atmospheric pressure and rapidly cooling the strand into a solid or non-heat plastified state. It is also possible to extrude and expand these alkenyl aromatic polymer particles directly upon exiting a die.

It is also possible to include in the alkenyl aromatic polymer/blowing agent mixture other additives which are known in the art such as fire retardants, stabilizers, fillers, anti-static agents and colorants. Also those materials known as "cell-size control additives" may be incorporated into the alkenyl aromatic polymer/blowing agent mixture for use in the production of uniform extruded foam prior to extrusion from a die.

While the expandable alkenyl aromatic polymer particles produced may be in any form, particularly preferred are those forms suitable for packaging or dunnage purposes and those forms which after expansion are suitable for molding purposes.

The present invention requires the inclusion of a density modifier in a heat-plastified alkenyl aromatic polymer/blowing agent mixture in an amount of from about 0.005 weight percent to about 0.5 weight percent by total mixture weight. The preferred ranges are from about 0.01 to about 0.3 weight percent by total mixture weight.

The density modifier is a compound providing thermal stability for the alkenyl aromatic polymer at extrusion and expansion conditions and which is also a liquid plasticizer at expansion conditions. Such density modifiers include, but are not limited to, octadecyl 3,5-di-tert-butyl-4-hydroxyhydrocinnamate (Irganox 1076 obtained from the Ciba-Geigy Corp.) and ethylene bis(oxyethylene)bis(3-tert-butyl-4-hydroxy-5-meythylhydrocinnamate) (Irganox 245 obtained from the Ciba-Geigy Corp.).

The following examples and comparative examples illustrate the present invention. The percentages are weight percent based on total mixture weight. CFC-11 is trichlorofluoromethane.

COMPARATIVE EXAMPLES

| Polystyrene ($M_w$ about 200,000) | Balance |
|---|---|
| Blowing Agent (80%/20% CFC-11/Pentane - weight percents based on weight of blowing agent mixture) | 10.1–10.3% |

EXAMPLE

| Polystyrene ($M_w$ about 200,000) | Balance |
|---|---|
| Blowing Agent (80%/20% CFC-11/Pentane - weight percents based on weight of blowing agent mixture) | 8.8% |
| Density Modifier (octadecyl 3,5-di-tert-butyl-4-hydroxyhydrocinnamate - Irganox 1076) | 0.2% |

The Example formulation differs only in the octadecyl 3,5-di-tert-butyl-4-hydroxyhydrocinnamate in an amount of about 0.2% and the reduced amount of about 8.8% blowing agent, instead of about 10.1% to about 10.3% blowing agent as is in the Comparative Example.

After producing these expandable polystyrene particles these samples are then expanded in an atmospheric steam chamber for controlled periods of time at a temperature generally ranging from about 85° C. (centigrade) to about 105° C., preferably about 100° C.

Typically the expansion scheme will consist of a 3 minute exposure followed by a 24 hour aging time at room conditions, then a second 3 minute exposure followed by a second 24 hour aging time, and then a third 1½ minute exposure and a third 24 hour aging time. After this third aging period the bulk densities of the expanded polystyrene particles are measured. This expansion scheme is followed to produce expanded polystyrene particles. The Comparative Example expanded polystyrene particle bulk densities range from about 0.28 to about 0.33 pounds per cubic foot. The Example expanded polystyrene particles of the present invention have a bulk density of about 0.26 pounds per cubic foot.

The ability to maintain an equivalent density with a decreased amount of blowing agent is found to be a result solely from the inclusion of the octadecyl 3,5-di-tert-butyl-4-hydroxyhydrocinnamate in an amount of about 0.2%, as stated in the Example into the expandable polystyrene particle formulation. Generally a blowing agent decrease will produce an expanded polystyrene particle of higher density than when less blowing agent is included, not a lower density.

As is apparent from the foregoing from this specification the present invention is susceptible of being embodied with various alterations and modifications which may differ particularly from those which have been described in the specification. For this reason it is to be fully understood that the examples are to be merely illustrative and should not be construed or interpreted as being restrictive or otherwise limiting of the present invention.

What is claimed is:

1. A method for making an expandable particle comprising:
   (a) preparing a heat-plastified mixture of:
      (1) an alkenyl aromatic polymer;
      (2) a volatile fluid blowing agent; and
      (3) a density modifier selected from the group consisting of ethylene bis(oxyethylene)bis(3-tert-butyl-4-hydroxy-5-methylhydrocinnamate) and octadecyl 3,5-di-tert-butyl-4-hydroxyhydrocinnamate in an amount from about 0.005 percent to about 0.5 percent by weight of the total mixture; and
   (b) extruding the mixture to form expandable alkenyl aromatic polymer particles.

2. A method for making an expandable particle, as recited in claim 1, wherein the density modifier is present in the heat-plastified mixture in an amount from about 0.01 percent to about 0.3 percent by weight of the total mixture.

3. A method for making an expandable particle, as recited in claim 1, wherein the density modifier is octadecyl 3,5-di-tert-butyl-4-hydroxyhydrocinnamate.

4. A method for making an expandable particle, as recited in claim 1, wherein the alkenyl aromatic polymer is polystyrene.

5. A method for making an expanded particle comprising:
   (a) preparing a heat-plastified mixture of:
      (1) an alkenyl aromatic polymer;
      (2) a volatile fluid blowing agent; and
      (3) a density modifier selected from the group consisting of ethylene bis(oxyethylene)bis(3-tert-butyl-4-hydroxy-5-methylhydrocinnamate) and octadecyl 3,5-di-tert-butyl-4-hydroxyhydrocinnamate in an amount from about 0.005 percent to about 0.5 percent by weight of the total mixture; and
   (b) extruding the mixture to form expanded alkenyl aromatic polymer particles.

6. A method for making an expanded particle, as recited in claim 5, wherein the density modifier is present in the heat-plastified mixture in an amount from about 0.1 percent to about 0.3 percent by weight of the total mixture.

7. A method for making an expanded particle, as recited in claim 5, wherein the density modifier is octadecyl 3,5-di-tert-butyl-4-hydroxyhydrocinnamate.

8. A method for making an expanded particle, as recited in claim 5, wherein the wherein the alkenyl aromatic polymer is polystyrene.

9. A method for reducing the density in expanded alkenyl aromatic polymer particles while using a constant amount of a volatile fluid blowing agent, comprising:
(a) incorporating a density modifier selected from the group consisting of ethylene bis(oxyethylene)bis(3-tert-butyl-4-hydroxy-5-methylhydrocinnamate) and octadecyl 3,5-di-tert-butyl-4-hydroxyhydrocinnamate into the expanded alkenyl aromatic polymer particles prior to expansion, with the alkenyl aromatic polymer being a polymer or copolymer having in chemically combined form at least 50 percent by weight styrene.

10. A method for reducing the amount of a volatile fluid blowing agent needed to produce expanded alkenyl aromatic polymer particles while maintaining a constant density comprising:
(a) incorporating a density modifier selected from the group consisting of ethylene bis(oxyethylene)bis(3-tert-butyl-4-hydroxy-5-methylhydrocinnamate) and octadecyl 3,5-di-tert-butyl-4-hydroxyhydrocinnamate into the expanded alkenyl aromatic polymer particles prior to expansion, with the thermoplastic resinous material being a polymer or copolymer having in chemically combined form at least 50 percent by weight styrene.

* * * * *

UNITED STATES PATENT AND TRADEMARK OFFICE
CERTIFICATE OF CORRECTION

PATENT NO. : 4,839,396

DATED : June 13, 1989

INVENTOR(S) : Martin H. Tusim

It is certified that error appears in the above-identified patent and that said Letters Patent is hereby corrected as shown below:

Column 5, line 1, "0.1" should correctly appear as --0.01--.

Signed and Sealed this

Twenty-first Day of August, 1990

*Attest:*

HARRY F. MANBECK, JR.

*Attesting Officer*  *Commissioner of Patents and Trademarks*